United States Patent Office 2,776,963
Patented Jan. 8, 1957

2,776,963

ACETYLDIGITOXIN-α

Arthur Stoll and Walter Kreis, Arlesheim, near Basel, Switzerland, assignors to Sandoz, A. G., Basel, Switzerland, a Swiss firm No Drawing. Application May 28, 1953,
Serial No. 358,196

Claims priority, application Switzerland June 7, 1952

3 Claims. (Cl. 260—210.5)

The present invention relates to acetyldigitoxin-α.

According to this invention, acetyldigitoxin-α can be obtained from acetyldigitoxin-β by heating it in an anhydrous or aqueous organic solvent at neutral, weakly acid or weakly alkaline pH, i. e. at a pH range from about 3.5 to about 8.

The acetyldigitoxin-β used for this purpose is a cardiac glycoside which can be obtained either by splitting off the glucose residue from lanatoside A, or by extraction of the leaves of Digitalis ferruginea. It is composed of the aglycone digitoxigenin and 3 molecules of digitoxose, to one of which an acetyl group is attached. Acetyldigitoxin-α, obtained from acetyldigitoxin-β by rearrangement according to the process herein described, differs from the latter in the position of the acetyl group.

The process may be carried out, for example, in the following manner: A solution of acetyldigitoxin-β in a suitable solvent, such as methanol, is boiled under reflux and then diluted with water. The unchanged acetyldigitoxin-β, which crystallizes out first, is filtered off and can again be submitted to the same process. On concentrating the filtrate, acetyldigitoxin-α separates out in crystalline form and after filtering off and recrystallizing is obtained in a pure state.

The acetyldigitoxin-α crystallizes from aqueous methanol in platelets melting at 217–221° C.

$$[\alpha]_D = +5° \pm 0.8°$$ (in pyridine)

Acetyldigitoxin-α exerts an extremely powerful and regular cardiotonic action without having a high toxicity. It is therefore useful in the treatment of heart conditions, such as auricular fibrillation and flutter, etc., and may be administered orally, parenterally or rectally.

The following examples illustrate presently-preferred embodiments of the invention. In these examples, parts by weight bear the same relationship to parts by volume as does the gram to the milliliter. Temperatures are in degrees centigrade.

Example 1

A solution of 5 parts by weight of acetyldigitoxin-β in 500 parts by volume of methanol is boiled under reflux for one hour. It is then treated with 150 parts by volume of water to precipitate unchanged starting material, and allowed to stand overnight in the ice-box. The acetyldigitoxin-β which crystallizes out is filtered off and the filtrate freed from methanol by concentration under reduced pressure. The acetyldigitoxin-α then crystallizes out and, after allowing the aqueous suspension to stand for several hours in the ice-box, is filtered off. A first purification is effected by rubbing with 20 volumes of acetone. After removing the acetone, the product is then further purified by dissolving in the smallest possible volume of chloroform and adding 2 to 3 volumes of ether. The purified substance melts at 217–221°.

$$[\alpha]_D = +5° \pm 0.8°$$ (in pyridine)

Example 2

5 parts by weight of acetyldigitoxin-β are dissolved in a mixture of 500 parts by volume of ethanol and 250 parts by volume of water, warming if necessary. The solution is boiled for one hour under reflux and then evaporated to dryness under reduced pressure. The residue is dissolved in 500 parts by volume of methanol, 150 parts by volume of water added and the solution inoculated with a trace of acetyldigitoxin-β. After standing for about 20 hours at 0°, the unchanged starting material which crystallizes out is filtered off and can be resubmitted to the same process. The filtrate is freed from methyl alcohol by concentration under reduced pressure, whereupon the acetyldigitoxin-α crystallizes out. After allowing the aqueous suspension to stand for several hours at 0°, the product is filtered off, dried and recrystallized by solution in the smallest possible quantity of chloroform followed by addition of 2 to 3 volumes of ether.

Example 3

5 parts by weight of acetyldigitoxin-β are dissolved in a mixture of 500 parts by volume of isopropyl alcohol and 100 parts by volume of water, warming if necessary. The solution is boiled for one hour under reflux and then evaporated to dryness under reduced pressure. The residue is dissolved in 500 parts by volume of methyl alcohol and the solution treated with 150 parts by volume of water, whereupon the unchanged acetyldigitoxin-β separates out. After standing for about 20 hours at a temperature of 0–4°, the solution is filtered and the methanol removed by evaporation under reduced pressure. The filtrate is again allowed to stand for several hours at a temperature of 0–4° and the acetyldigitoxin-α is then filtered off and dried. It is recrystallized once or twice by solution in the smallest possible quantity of chloroform followed by addition of 2–3 volumes of ether.

Example 4

5 parts by weight of acetyldigitoxin-β are dissolved in a mixture of 500 parts by volume of acetone and 100 parts by volume of N/10 acetic acid, warming if necessary. The solution is boiled for several hours under reflux, then neutralized with dilute alkali and the acetone removed by concentration under reduced pressure. After allowing to stand for a long time at a temperature of 0–4°, the precipitate is filtered off and dried. It is then dissolved in 100 volumes of methanol and 30 volumes of water added. After allowing to stand for a long time at a temperature of 0–4°, the unchanged acetyldigitoxin-β is filtered off and the filtrate freed from methyl alcohol by evaporation under reduced pressure. The residue is kept in the cold for several hours and the substance which separates out is then filtered off, dried and again dissolved in 100 volumes methanol, the solution being treated with a further 30 volumes of water. On standing in the cold, the remainder of the unchanged substance separates out and is filtered off. The filtrate is evaporated to dryness under reduced pressure and the residue, which consists of acetyldigitoxin-α, is recrystallized once or twice by dissolving in the smallest possible volume of chloroform and adding 2 to 3 volumes of ether.

Example 5

A solution of 5 parts by weight of acetyldigitoxin-β in 125 parts by volume of pyridine is treated with 25 parts by volume of water and heated for one hour on the water bath. The solution is then evaporated to dryness under reduced pressure, the residue dissolved in 100 parts by volume of methanol and the solution treated with 30 parts by volume of water. After standing for a long time at a temperature of 0–4°, the unchanged starting material crystallizes out and is filtered off. The filtrate is freed from methanol by concentration under reduced pressure and the product which separates out is filtered off and dried. It is then dissolved in 100 volumes methanol and 30 volumes of water added. After long standing at a temperature of 0–4°, the solution is again filtered to remove unchanged acetyldigitoxin-β and the filtrate freed from methanol by concentration under reduced pressure. The aqueous suspension is once more left to stand for a long time at a temperature of 0–4° and the acetyldigitoxin-α which separates out is then filtered off and recrystallized once or twice by solution in the smallest possible quantity of chloroform followed by addition of 2 to 3 volumes of ether.

Having thus disclosed the invention, what is claimed is:

1. A process for the preparation of acetyldigitoxin-α which comprises the step of heating a solution of acetyldigitoxin-β in an organic solvent at a pH ranging from weakly acid to weakly alkaline, whereby rearrangement takes place with shifting of the position of the acetyl group.

2. A process according to claim 1 wherein the solvent is an anhydrous solvent.

3. A process according to claim 1 wherein the solvent is an aqueous solvent.

References Cited in the file of this patent

Chem. Abst., v. 28, 4738 (1934).
Chem. Abst., v. 42, 1301, 1308 (1948).
Chem. Abst., v. 46, p. 6661 (1952) citing Helv. Chim. Acta, v. 34, pp. 7460–77 (1952).